Sept. 13, 1938.  J. D. LEWIS  2,130,017
SEALING GASKET
Filed June 22, 1935
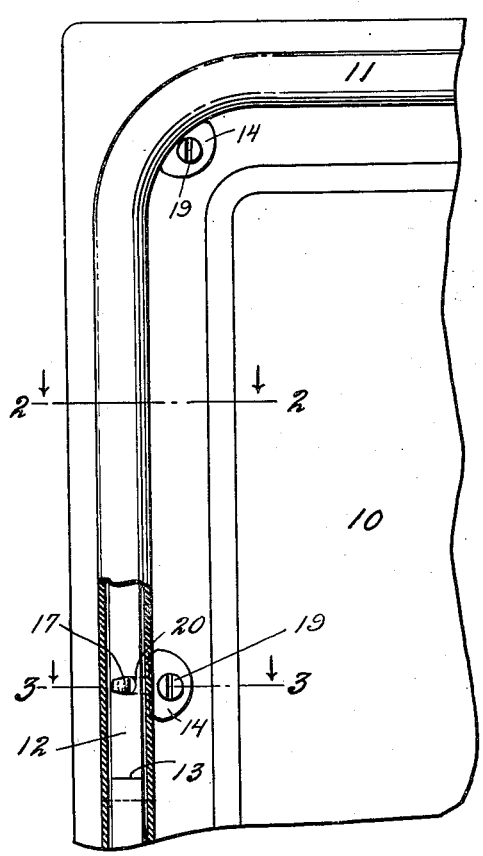
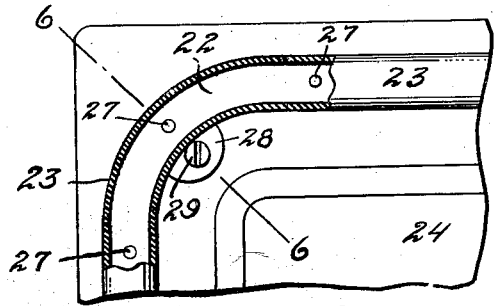
Fig. 5.
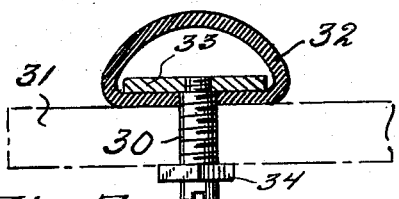
Fig. 7.
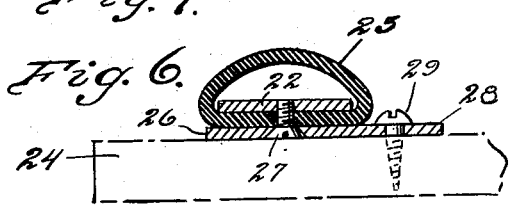
Fig. 6.
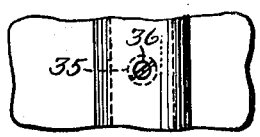
Fig. 1.  Fig. 8.
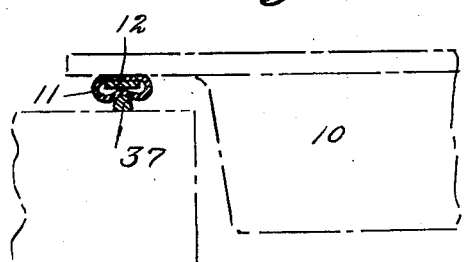
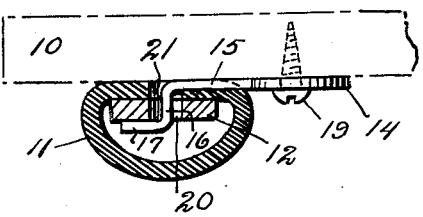
Fig. 2.  Fig. 3.
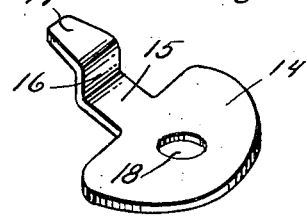
Fig. 4.
Inventor
Joseph D. Lewis
By  Ernest F. Mechlin
Attorney Patented Sept. 13, 1938

2,130,017

UNITED STATES PATENT OFFICE 2,130,017

SEALING GASKET

Joseph D. Lewis, Santa Barbara, Calif.

Application June 22, 1935, Serial No. 27,977

6 Claims. (Cl. 20—69)

The invention relates to packing for closures of the non-sliding type and has for its object the provision of a novel sealing gasket particularly designed and adapted for use in connection with domestic and commercial refrigerator doors, refrigerator car doors and the like, though its use is not so limited in that it may be employed to equal advantage on the doors of dishwashing machines, sterilizers and in fact in numerous other locations where it is desired to provide a definitely sealed joint.

An important object of the invention is to provide a gasket of this character which may be applied with equal ease to new or already existing equipment in a very simple manner and without any necessity for using elaborate tools and without involving making any changes or alterations in the door or other closure itself.

Another object is to provide a gasket for the above purposes which is made of rubber and metal and which will therefore be free from deterioration when exposed to water or steam.

Yet another object is to provide a gasket of this type of tubular form and containing a metallic strip and which will therefore provide an adequate cushion in addition to being durable, it being moreover a feature that the construction is such as to permit unusually acute corners.

A further object is to provide a construction of this character embodying simple and novel securing means for fastening it in place.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a fragmentary elevation showing one corner of a refrigerator door or the like equipped with my novel gasket, Figure 2 is a cross section therethrough taken on the line 2—2 of Figure 1, the door and frame being shown by dot and dash lines, Figure 3 is a detail section on a larger scale taken on the line 3—3 of Figure 1 and showing the fastening means, the door being represented only by broken lines, Figure 4 is a perspective view of one of the fasteners, Figure 5 is a view similar to Figure 1 but showing a modification, Figure 6 is a detail cross section taken on the line 6—6 of Figure 5, with the door represented by dot and dash lines, Figure 7 is a detail cross section showing yet another variation of the invention.

Figure 8 is a fragmentary view showing yet another form.

Referring more particularly to the drawing the numeral 10 designates a portion of a door of the type designed for use on refrigerators, sterilizers and the like though this is merely illustrative as it is clear that the door might be the closure for something of an entirely different nature as it is readily conceivable that the invention may be applied or at least adapted or modified to be applied to doors, French windows and the like. It is also to be understood that my gasket may not be mounted on the door itself but might be located about a door opening in position to be engaged by the door when it is closed.

In the first and preferred form of the invention I provide flexible waterproof tubing 11, preferably rubber, within which is located a rigid, preferably metallic strip 12 shaped to conform rather closely to the shape of the door, in other words suitably bent where necessary to provide the proper corners. The bending might be effected before or after insertion of the strip within the tubing, the former being probably preferable as no particular difficulty should be encountered in threading the strip through the tubing or drawing the tubing over the strip. Naturally the strip cannot be made as a continuous frame as otherwise the tubing could not be applied. The ends of the strip may be simply abutted as indicated at 13 and it is preferable that the joint between the ends of the tubing be out of registration with the joint 13 as indicated in Figure 1. The rigid strip is of less width than the internal diameter of the tubing so that a large portion of the latter will retain its cylindrical shape and therefore constitute an air cushion.

In order that the gasket may be readily fastened to a door or door frame, I make use of a plurality of clips shown in detail in Figure 4, these clips 14 being formed as metal disks, preferably of semicircular shape and each formed with a tongue 15 bent over at right angles intermediate its ends as shown at 16 so as to provide an offset end portion or tip 17. Each clip is formed with a hole 18 for the passage of a securing screw 19. In order that these clips may be utilized for fastening the gasket in place, the metal strip and the rubber tubing are formed at intervals with registering holes 20 and 21, respectively, of a size suitable for the reception of the offset portion 16 and tip 17 of the clips.

To effect mounting, the end portions or tips 17 of the respective clips are inserted through the holes 20 and 21 and each clip is then moved to extend at right angles to the gasket and in parallel relation to the plane of the strip as shown in Figure 3, wherein it is clearly disclosed that when the clips are in this position the offset or intermediate portions 16 thereof extend through the holes 20 and 21 with the tips 17 located within the rubber tubing and overlying the metal strip. When the screws 19 are applied it will be clear that the entire gasket will be firmly secured to the door or door frame as the case may be.

The invention is susceptible of modification and in Figures 5 and 6 I have shown a metal strip 22, corresponding to the strip 12 and similarly enclosed within rubber tubing 23 and mounted on the door 24 by means of an underlying foundation strip 26 to which it is secured by screws 27 which pass through the foundation strip 26, through the wall of the tubing and into the strip 22. The foundation strip 26 is formed at intervals with ears 28 through which pass screws 29 corresponding to the screws 19 and by means of which the assembled gasket is secured in place on the door.

In heavy installations or in connection with heavy equipment, for example on refrigerator car doors I may resort to the employement of still different securing means as shown in Figure 7. In this instance, the foundation strip is omitted and I provide any suitable number of screws 30 threaded through the door 31, passing through holes in the tubing 32 and having reduced threaded ends screwed into tapped holes in the metal strip 33 enclosed within the tubing. A lock nut 34 bearing against the outside of the door may be provided on each screw 30 to prevent accidental unscrewing and loosening of the gasket as the result of jars caused by opening and closing of the door or as the result of vibration during travel of the car.

Another mode of attachment, shown in Figure 8, which is simple and yet effective is to employ wood or machine screws 35 passing through the metal strip and into the door of the frame as the case may be, the rubber tube being formed with holes 36 through which the screws are inserted and which give access to a screw driver for turning the screws. The holes can be much smaller in diameter than the screw heads as the rubber may be easily stretched.

Though it is not necessary I may in some instances prefer to provide a relatively narrow strip 37 which may be applied to the door or the door frame and which impinges against the center of the rubber tubing when the door is closed, the purpose being to increase the sealing action, this being particularly desirable in case the gasket is applied to the door or some device within which there may be steam pressure, for instance a washing machine, sterilizer or the like.

From the foregoing description and a study of the drawing it will be apparent that I have thus provided a very simply constructed and consequently inexpensive sealing gasket which may be readily applied without difficulty and which will be highly efficient, particularly as it is possible to have fairly sharp or acute corners without buckling the rubber tubing and for the further reason that as rubber is waterproof the strip will not be subject to rapid deterioration as is the case with known varieties. The tubing may have a relatively heavy wall so as to provide a very effectual cushion which will insure a tight and leak-proof joint. It is believed from the above that the construction and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A sealing gasket for cooperation with a closure, comprising a rubber tube, a metal strip enclosed therein, and securing means passing through the wall of the tube and through a hole in the strip and overlying the inner face thereof, said securing means being adapted for fastening upon a door or door frame whereby the rubber tube will be compressed when the door is closed.

2. A sealing gasket for a closure comprising a rubber tube, a rigid strip located therein and of less width than the internal diameter of the tube to enable the latter to constitute an air cushion, and a plurality of securing elements for mounting the assembly upon a door or door frame, said securing elements being located at spaced intervals and extending through registering holes in the rubber tube and rigid strip, each of said securing elements having an offset tongue overlying the inner face of the metal strip.

3. A sealing gasket for a closure comprising a tube of flexible waterproof material, a rigid strip located therein and shaped to conform substantially to the contour of the closure, and means for mounting the assembly upon a door or door frame comprising a plurality of clips located at intervals and secured to the door or door frame, each of said clips having a tongue with a laterally offset intermediate portion adapted to pass through registering holes in the flexible tube and rigid strip and having end portions overlying the inner surface of the rigid strip.

4. A sealing gasket for interposition between coacting members, comprising a flexible tube, a rigid strip located within the tube and of less width than the diameter thereof to enable the tube to act as an air cushion, said rigid strip and the wall of the tube adjacent the same being formed with registering holes, and secured means formed as a plate carried by the member against which the tube is disposed, said plate having an elongated tongue thereon with an offset end extending through said registering holes and overlying said rigid strip.

5. A sealing gasket for interposition between coacting members, comprising a flexible tube, a rigid strip located within the tube and of less width than the diameter thereof to enable the tube to act as an air cushion, said rigid strip and the wall of the tube adjacent the same being formed with registering holes, and securing means formed as a plate carried by the member against which the tube is disposed, said plate having an elongated tongue thereon with an offset end extending through said registering holes and overlying said rigid strip, said registering holes and said securing means being located at spaced intervals.

6. Packing means for interposition between two relatively movable members, comprising a flexible tube, a flat rigid strip extending longitudinally within said tube, and rigid means entering said tube and strip and secured to one of said members and projecting laterally beyond said tube.

JOSEPH D. LEWIS.